United States Patent [19]

Worrel et al.

[11] Patent Number: 5,307,952

[45] Date of Patent: May 3, 1994

[54] TOP DRESSER

[75] Inventors: Vernon J. Worrel, Mahtomedi; Terry Bondeson, Woodbury, both of Minn.

[73] Assignee: Turfco Manufacturing Incorporated, Minneapolis, Minn.

[21] Appl. No.: 948,664

[22] Filed: Sep. 22, 1992

Related U.S. Application Data

[63] Continuation-in-part of Ser. No. 651,467, Feb. 6, 1991, abandoned.

[51] Int. Cl.⁵ .............................................. A01C 19/00
[52] U.S. Cl. ...................................... 222/1; 222/263; 222/314; 222/342; 222/414; 222/415; 222/626; 239/672; 414/502; 414/517; 198/690.2
[58] Field of Search ............... 222/262, 263, 312, 313, 222/314, 333, 342, 392, 414, 626, 1, 415, 371; 239/668, 669, 672, 676, 679, 680; 267/41, 229; 280/699; 414/502, 517, 519; 298/1 B, 1 V; 198/310, 642, 690.2

[56] References Cited

U.S. PATENT DOCUMENTS

| | | | |
|---|---|---|---|
| 397,215 | 2/1889 | Ballard | 222/161 |
| 810,510 | 1/1906 | Robins, Jr. | 198/690.2 |
| 874,982 | 12/1907 | Norton | 198/690.2 |
| 979,200 | 12/1910 | Prosser | 198/690.2 |
| 1,850,259 | 3/1932 | Bugatti | 267/41 |
| 2,019,725 | 11/1935 | Peo | 280/699 |
| 2,030,541 | 2/1936 | Rose | 222/314 |
| 2,286,576 | 6/1942 | Ronning | 280/104 |
| 2,321,082 | 6/1943 | Harshberger | 222/414 X |
| 2,478,228 | 8/1949 | Benson | 239/676 |
| 2,774,602 | 12/1956 | Sanderson | 239/657 |
| 2,865,536 | 12/1958 | Price | 222/414 |
| 2,913,150 | 11/1959 | Seale | 222/415 X |
| 3,161,305 | 12/1964 | Ferrari et al. | 414/517 |
| 3,207,382 | 9/1965 | Chappuis | 222/254 |
| 3,336,627 | 8/1967 | Nemoede et al. | 222/613 |
| 3,682,333 | 8/1972 | Krause | 239/679 |
| 3,756,382 | 9/1973 | Adey, Jr. et al. | 198/690.2 |
| 3,788,529 | 1/1974 | Christy | 222/314 |

(List continued on next page.)

FOREIGN PATENT DOCUMENTS

| | | | |
|---|---|---|---|
| 109636 | 5/1899 | Fed. Rep. of Germany | 239/668 |
| 248403 | 3/1911 | Fed. Rep. of Germany | 239/680 |
| 2134615 | 1/1973 | Fed. Rep. of Germany | 239/668 |
| 993310 | 10/1951 | France | 239/672 |
| 0963912 | 10/1982 | U.S.S.R. | 198/690.2 |
| 1205135 | 9/1970 | United Kingdom | 239/672 |
| 8602520 | 5/1986 | World Int. Prop. O. | 239/679 |
| 8807813 | 10/1988 | World Int. Prop. O. | 239/668 |

Primary Examiner—Andres Kashnikow
Assistant Examiner—Anthoula Pomrening
Attorney, Agent, or Firm—Peterson, Wicks, Nemer & Kamrath

[57] ABSTRACT

A top dresser (10) is disclosed in a first preferred form including a discharge gate (56) of a pusher (44) movably mounted in a hopper (30) for forcing material forward towards a rotating, cylindrical, dispensing drum (66) as the top dresser (10) is being pulled forward. The pusher (44) is slideably mounted by slides (50) secured to ears (48) extending between the sides (36) and the bottom (34) of the hopper (30) and slideable on tubular rails (52) positioned on the outside of the hopper (30). The pusher (44) is moved by expandable and contractable actuators (58, 60) pivotally mounted by their opposite ends to the frame (12) and the pusher (44) in a non-parallel, crossing manner. The drum (66) includes corrugated sheeting (70) around its periphery for gripping the material in the hopper (30) and drawing it under a metering gate (72) and a rotating brush (74) which propels the material onto the ground. The top dresser (10) is movably supported by four wheel assemblies each having a pair of wheels (16) rotatable about an axle (28) of a block (24) pivotable about stub shafts (26) pivotally mounted to the free end of a cantilevered mounted leaf spring (20). In an alternate form, a top dresser (100) is disclosed including an endless conveyor (140) including the corrugated sheeting (70) in the form of an endless belt passing around spaced, parallel rollers (148, 160) and beneath a hopper (136) for dispensing the material from the hopper (136) onto the ground and through the end of the hopper (136).

29 Claims, 3 Drawing Sheets

U.S. PATENT DOCUMENTS

| | | | |
|---|---|---|---|
| 3,860,256 | 1/1975 | Jackson et al. | 280/81 R |
| 3,896,947 | 7/1975 | Pearce | 239/676 |
| 3,907,211 | 9/1975 | O'Reilly | 239/676 |
| 4,002,272 | 1/1977 | Crawford et al. | 222/392 |
| 4,029,237 | 6/1977 | Miconi | 222/614 |
| 4,036,304 | 7/1977 | Crow, Jr. | 280/104 |
| 4,067,501 | 1/1978 | Tate | 239/672 |
| 4,072,272 | 2/1978 | Harder | 239/676 |
| 4,094,373 | 6/1978 | Crow, Jr. | 180/1 F |
| 4,220,280 | 9/1980 | Trott et al. | 239/679 |
| 4,438,873 | 3/1984 | Kaercher, Jr. | 222/616 |
| 4,541,570 | 9/1985 | Rieke et al. | 239/676 |
| 4,709,861 | 12/1987 | Henderson | 239/675 |
| 4,767,063 | 8/1988 | Wall et al. | 239/672 |
| 4,804,145 | 2/1989 | Seymour et al. | 239/666 |
| 4,877,366 | 10/1989 | De Filippi | 414/517 |
| 4,938,650 | 7/1990 | Jenkins et al. | 414/469 |

ём
TOP DRESSER

CROSS REFERENCE

The present application is a continuation-in-part of application No. 07/651,467 filed Feb. 6, 1991, now abandoned.

BACKGROUND

The present invention generally relates to an apparatus for dispensing or spreading material, particularly to an apparatus for top dressing terrain, and specifically in a most preferred form to front unloading top dressers.

Various apparatus exist for applying top dressing to the turf of golf courses, lawns, football, baseball and soccer fields, parks, recreational areas, and the like, for applying calcined clay on baseball diamonds, for sanding icy sidewalks and driveways, and for like applications of a ribbon of material at a preselected rate. An example of one of such apparatus is shown in U.S. Pat. No. 4,438,873 which has been widely and very successfully marketed under the trademark TURFCO METER-MATIC. With the increasing awareness of the importance of top dressing in turf management, an increasing need exists for improved dispensers to allow the effective, efficient application of material with minimal damage to the turf and with increased ease of operation.

SUMMARY

Accordingly, a general object of the invention is to provide a top dresser that is simple, both as to its structure and to the manner in which it is operated.

Another object of the invention is to provide a front unloading top dresser. Specifically, prior top dressers dispensed the material behind the hopper. This was disadvantageous for several reasons. First, operation of the dispensing means was not visible to the operator on the utility vehicle pulling the top dresser as the hopper blocked his view. Thus, any problems encountered with the dispensing means including running out of material for at least portions of the dispensing means was only evidenced after the operator was able to see the applied area after the top dresser had advanced a sufficient distance for the operator to see the applied area over the hopper. Thus, it is an aim of the present invention to allow the material being dispensed to be easily viewed by the operator.

Another object of the invention is to provide a unique hopper construction. Specifically, prior top dressers utilized gravity to advance the material to the dispensing means. Thus, the hoppers of prior top dressers tended to be arranged vertically to take advantage of gravitational forces. This was disadvantageous because loading of such hoppers was more difficult, viewing by the operator behind the top dresser was more difficult, and the like. In one aspect of the present invention, the top dresser of the present invention includes a discharge gate slideable in the hopper for pushing the material towards the dispensing means. In a preferred aspect of the invention, the discharge gate is slideably mounted to the hopper by means located outside of the hopper and thus not subject to the sand, grit or the like of the material of the hopper. In another preferred aspect of the invention, the discharge gate is slid by an expandable and contractable actuator mounted at an angle to the direction of movement of the discharge gate to reduce the overall length required for the top dresser Yet another object of the invention is to provide a unique dispensing means. Specifically, it is an aim of the present invention to provide dispensing means in the form of corrugated sheeting movable relative to the end of the hopper, with the corrugated sheeting including a multiplicity of spaced, parallel ribs extending continously in the direction generally perpendicular to the movement direction of the sheeting and defining spaced channels therebetween of generally constant depths for receiving material. Additionally, prior top dressers utilized endless conveyors on the bottom of the hopper to bring the material to the dispensing means. Such endless conveyors were then especially prone to wear as the full mass of the material in the hopper was exerted thereon and included components which were movable relative to each other and thus subject to increased friction due to the presence of sand, grit, and the like in the material to be dispensed. In one aspect of the present invention, the corrugated sheeting is arranged around the periphery of a rotatable, cylindrical drum to grip the material and move it from the hopper under a metering gate for dispensing onto the ground. It can be appreciated that the cylindrical drum is not as prone to wear as endless conveyors and is simpler to manufacture, assemble, and maintain.

Still another object of the invention is to provide a unique manner of movably supporting the top dresser upon the ground in a manner to follow the terrain to reduce the uneven distribution of weight to the terrain. In a further aspect of the present invention, the material is dispensed in front of the movably supporting means such that the material is dispensed prior to the turf being compressed by the movably supporting means.

Surprisingly, all of the above objectives can be satisfied in the field of material dispensing by illustrative embodiments of top dressers according to the preferred teachings of the present invention, detailed descriptions of which are described in connection with the drawings

Figure 1:
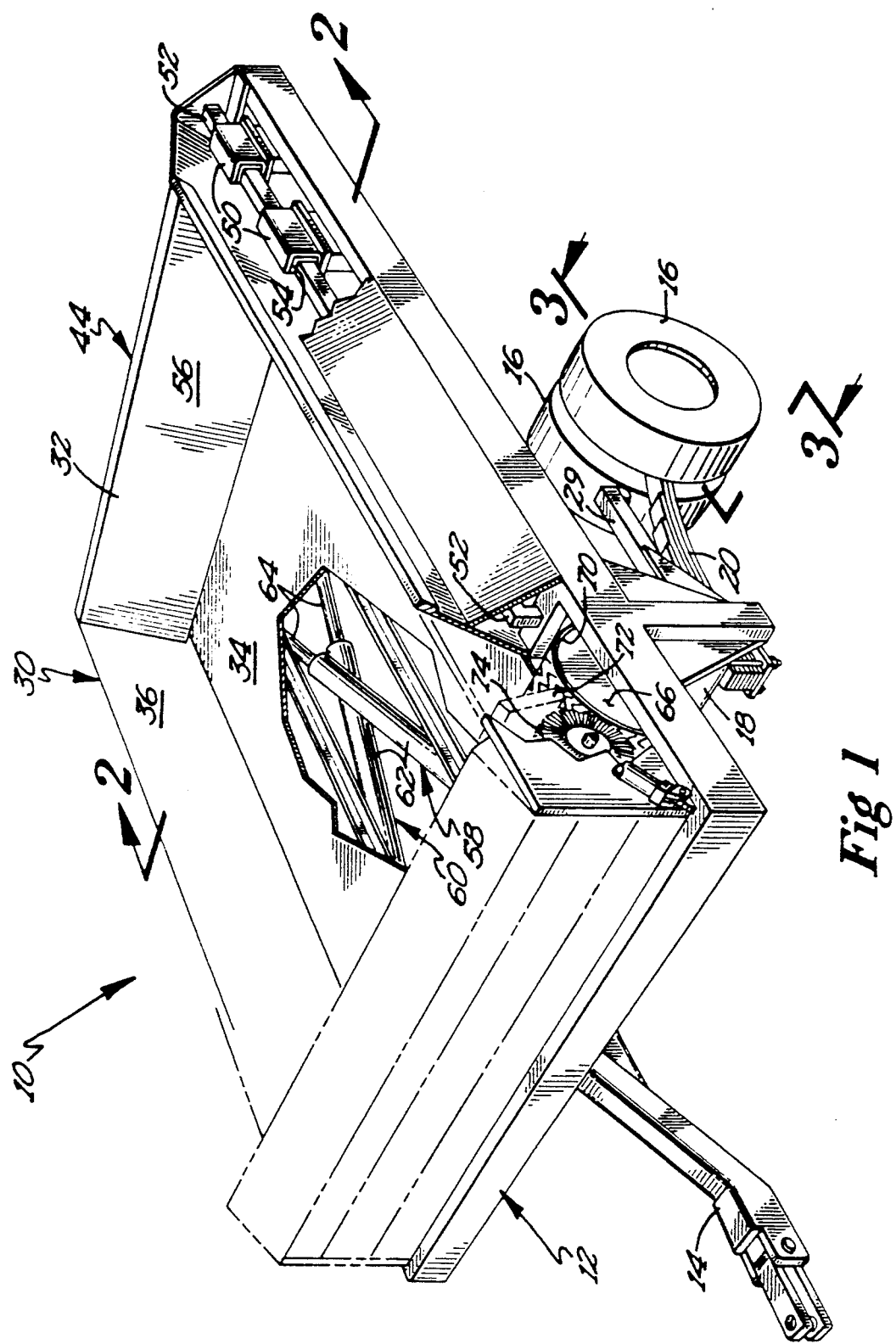
FIG. 1 shows a perspective view of a top dresser according to the preferred teachings of the present invention, with portions being broken away to expose constructional details
Figure 2:
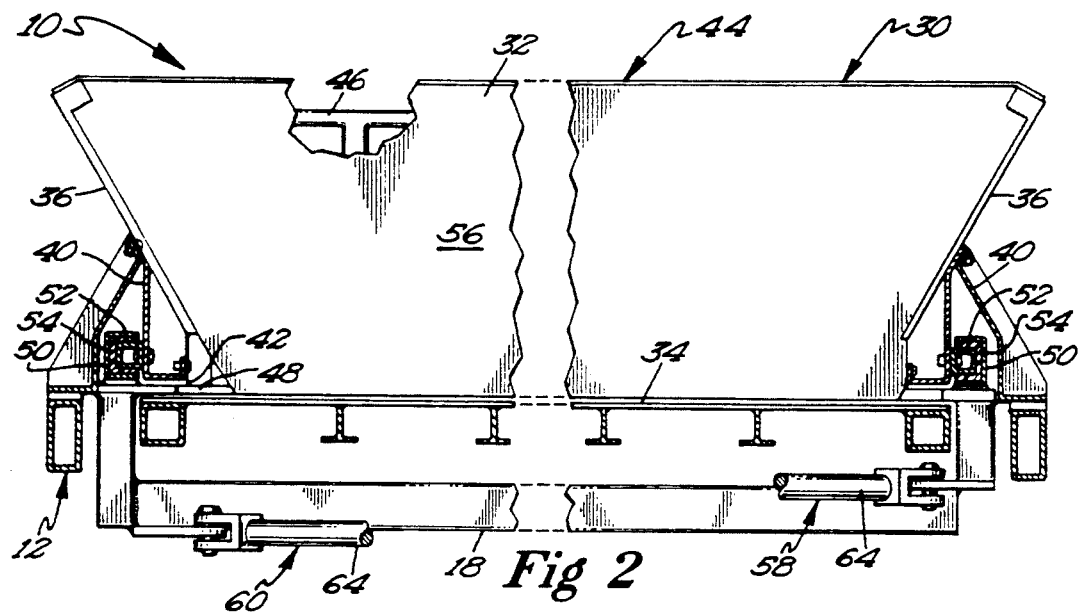
FIG. 2 shows a cross-sectional view of the top dresser of FIG. 1 according to section line 2—2 of FIG. 1.
Figure 3:
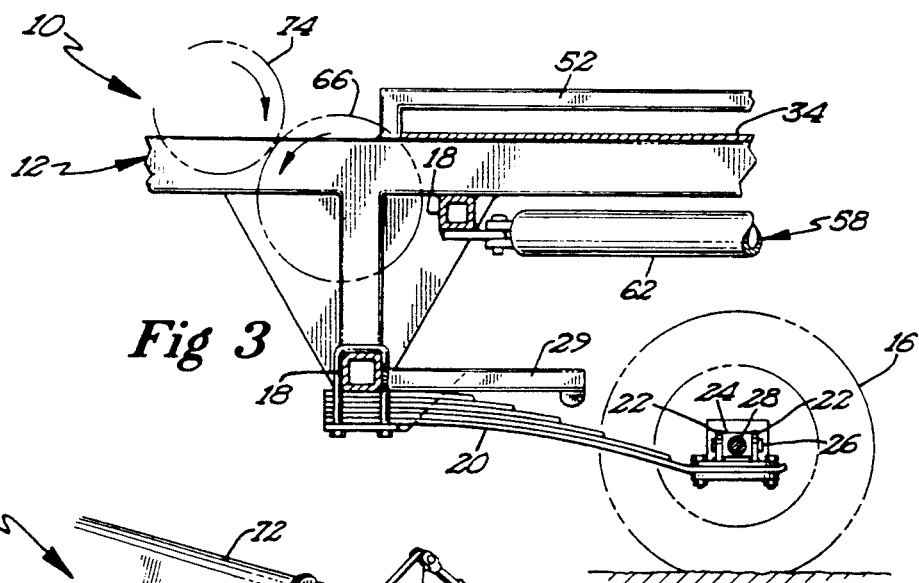
FIG. 3 shows a partial, cross-sectional view of the top dresser of FIG. 1 according to section line 3—3 of FIG. 1.
Figure 4:
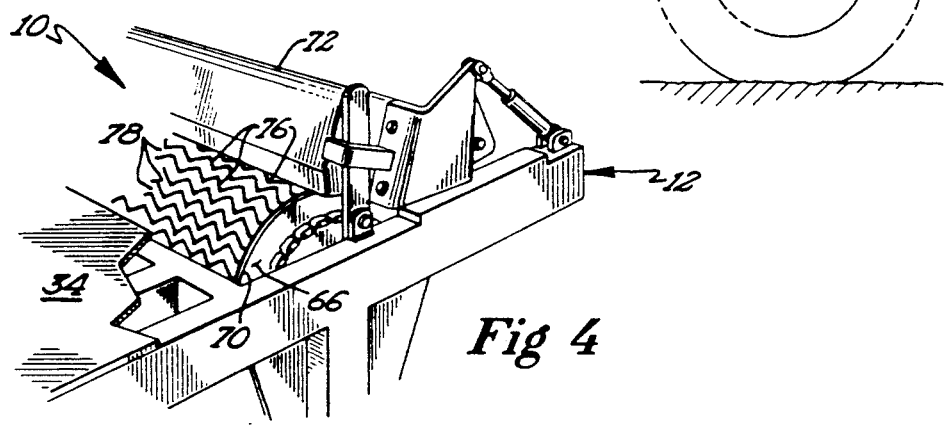
FIG. 4 shows a partial, enlarged view of the top dresser of FIG. 1, with portions being broken away.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "end", "side", "above", "longitudinal", and similar terms are used herein, it should be understood that these terms have reference only to the structure shown in the drawings as it would appear to a person viewing the drawings and are utilized only to facilitate describing the invention.

DESCRIPTION

A top dresser according to the preferred teachings of the present invention is shown in the drawings and generally designated 10. Top dresser 10 comprises a frame 12 having a drawbar 14 by which top dresser 10 can be coupled to a towing tractor or utility vehicle for pulling thereby in a direction. In the preferred form, frame 12 is movably supported upon the ground by four wheel assemblies, each having a pair of high floatation wheels 16. Each pair of wheels 16 is mounted to frame 12 to allow movement vertically as well as to allow pivoting about a longitudinal axis to follow the terrain over which top dresser 10 is being pulled. Particularly, frame 12 includes a cross beam 18 extending laterally across top dresser 10. Each pair of wheels 16 is independently sprung from each other and includes a leaf spring 20 having a first end mounted to cross beam 18 by any suitable means such as U-shaped clamps. The free end of each leaf spring 20 includes first and second upstanding, laterally extending, parallel ears 22. An axle mounting block 24 is located between ears 22 and pivotally mounted about a longitudinal axis defined by stub shafts 26 extending from opposite sides of block 24 and through ears 22. Axle 28 for the pair of wheels 16 extends through block 24 generally perpendicular to the axis defined by stub shafts 26 and generally laterally of top dresser 10. In the preferred form, leaf springs 20 for each pair of wheels 16 extend from cross beam 18 generally parallel to each other with axles 28 for each pair of wheels 16 extending the same longitudinal distance from cross beam 18. Each wheel assembly includes a snubber bar 29 mounted in a cantilever manner to cross beam 18 spaced above and generally parallel to leaf spring 20. Snubber bar 29 includes a free end for abutting leaf spring 20 intermediate cross beam 18 and the free end of leaf spring 20 for limiting the vertical travel of leaf spring 20.

A hopper 30 is mounted on frame 12 and generally includes an open top 32, a closed floor or bottom 34, first and second, parallel closed sides 36 and a front. Sides 36 are mounted spaced above bottom 34 by a super-structure 40 to provide a gap 42 having a constant height between sides 36 and bottom 34. A pusher 44 extending between sides 36 is movably mounted for longitudinal movement on bottom 34 and between sides 36. Specifically, pusher 44 includes a carrier frame 46 slideable along bottom 34 and including ears 48 extending from the opposite sides of pusher 44 through gaps 42 beyond sides 36 for slideable receipt between sides 36 and bottom 34. In the most preferred form, pusher 44 is slideably supported relative to hopper 30 by C-shaped slides 50 mounted outside of sides 36 and on ears 48. Slides 50 have a size complementary to and for slideable receipt on longitudinally extending, elongated tubular rails 52 secured to superstructure 40 outside of sides 36 and generally longitudinally of top dresser 10. Thus, sides 36 are located intermediate rails 52. In the preferred form, C-shaped friction blocks 54 are slideably received on rails 52 and secured within slides 50. Friction blocks 54 reduce the wear and friction between slides 50 and rails 52 to reduce maintenance and energy requirements. Slides 50 and blocks 54 on opposite sides of hopper 30 have their free ends pointing at each other. In the most preferred form, two sets of slides 50 and blocks 54 are slideable on rail 52 on each side of hopper 30 to control the motion of pusher 44 to follow a straight line within hopper 30. Pusher 44 further includes a discharge gate 56 secured to carrier frame 46 and extending from bottom 34 and between sides 36 and movable relative thereto. In its most preferred form, gate 56 slopes rearward from bottom 34. Suitable provisions such as sealing gaskets or flaps can be provided to prevent sand, dirt, or other material from passing between pusher 44 and bottom 34 and sides 36 of hopper 30 and/or around ears 48 and through gap 42.

In the most preferred form, pusher 44 is longitudinally moved in hopper 30 between a first, expanded position and a second, unloaded position by first and second, cross mounted, expandable and contractable, hydraulic actuators 58 and 60 mounted outside of hopper 30 and in the preferred form below bottom 34 of hopper 30. The first ends of actuators 58 and 60 shown as the free ends of cylinders 62 are pivotally mounted to frame 12 about axes generally in front of hopper 30 and in the preferred form slightly spaced from and on opposite sides of the center of frame 12. Actuator 58 is shown as being mounted vertically above actuator 60. The opposite ends of actuators 58 and 60 shown as the free ends of piston 64 are pivotally mounted about axes to ears 48 of pusher 44 and outside of hopper 30. In the most preferred form, actuator 58 mounted on the right side of frame 12 extends to ear 48 on the left side of pusher 44 such that the plane of actuator 58 extending through its mounting axes is at an angle to the direction top dresser 10 is pulled. Likewise, actuator 60 mounted on the left side of frame 12 extends to ear 48 on the right side of pusher 44 such that the plane of actuator 60 extending through its mounting axes is at an angle to the direction top dresser 10 is pulled. Further, the planes of actuators 58 and 60 intersect at an angle other than 180° or in other words are mounted in an X configuration, with the angle between actuators 58 and 60 being variable with the expansion and contraction of actuators 58 and 60. It can then be appreciated that actuators 58 and 60 are extended when pusher 44 is in its rearward position and that actuators 58 and 60 are contracted when pusher 44 is in its forward position.

A revolving, cylindrical, dispensing drum 66 is mounted to frame 12 about a laterally extending axis located in front of and below bottom 34 of hopper 30. Drum 66 in the most preferred form is cylindrical and has a periphery covered with sheeting 70. Drum 66 is mounted with sheeting 70 generally extending closely adjacent to but extending above bottom 34 of hopper 30. In the most preferred form, bottom 34 of hopper 30 extends in a non-tangential manner from drum 66 and includes suitable provisions such as a rubber or any other reliable, flexible strip fastened to bottom 34 and laying upon drum 66 for preventing material from backing its way out of hopper 30 between drum 66 and bottom 34.

A metering gate 72 is movably mounted relative to drum 66 in front of bottom 34 and generally at the uppermost part of drum 66. Gate 72 is movable away from drum 66 by any suitable means to create a larger gap for material to pass therethrough such as by pivotably moving gate 72 by hydraulic actuators. A cylindrical brush 74 is movably and rotatably mounted in front of, above and parallel to drum 66 and on the opposite side of drum 66 than hopper 30. Brush 74 includes bristles which engage sheeting 70 on the periphery of drum 66 after gate 72, with the engagement of bristles with sheeting 70 being minimal for dry material while interfering with sheeting 70 for wet material. Drum 66 is rotated in a forward direction, i.e. with the periphery of drum 66 above bottom 34 of hopper 30 moving in the direction top dresser 10 is being pulled to draw material from hopper 30 towards and under metering gate 72. Brush 74 is rotated in an opposite direction to propel material from drum 66 onto the ground being dressed with a force sufficient to penetrate to the base of the turf.

Sheeting 70 in the most preferred form includes provisions for gripping the sand or dressing material and moving it from hopper 30 under gate 72 into rotating brush 74 and then onto the ground. In the preferred form, sheeting 70 is corrugated and includes spaced, parallel ribs 76 defining spaced cavities or channels 78 therebetween for receiving material. The shape and configuration of ribs 76 must be such that with drum 66 stationary and with metering gate 72 brought down to engage drum 66 and close the opening therebetween, material, even dry materials with small particle size, will not leak or fall through the gaps between sheeting 70 and metering gate 72. In the preferred form, ribs 76 extend generally perpendicular to the direction top dresser 10 is being pulled and to the direction of rotation of drum 66. In the most preferred form, ribs 76 are in the form of multiple contiguous "W"s in a herring-bone arrangement.

Furthermore, the shape and size of cavities 78 formed by ribs 76 must allow the bristles of brush 74 to enter cavities 78 and remove the material therein In the preferred form, the height of ribs 76 or in other words the depth of channels 78 is generally equal to or greater than the diameter of the largest granule of sand or material to be dressed and in the most preferred form is in the range of 0.125 to 0.156 inch (0.318 to 0.397 centimeters). The spacing between ribs 76 or in other words the width of channels 78 is a multiple of the height of ribs 76 or depth of channels 78 and in the most preferred form is in the range of 0.5 to 0.75 inch (1.27 to 1.91 centimeters).

Now that the basic construction of top dresser 10 according to the preferred teachings of the present invention has been explained, the operation, advantages, and subtle features of top dresser 10 can be set forth and appreciated. Specifically, it will be assumed that pusher 44 is located in its first, expanded position adjacent the rear of hopper 30 spaced from the front of hopper 30 and dispensing drum 66, hopper 30 has been filled with material for top dressing, and top dresser 10 has been pulled to the location to be top dressed. As top dresser 10 is being towed or pulled, drum 66 and brush 74 are rotated by any suitable means such as hydraulic motors. Drum 66 grips material in hopper 30 and moves it from hopper 30 under metering gate 72. It can be appreciated that gate 72 can be positioned at the desired spacing from drum 66 to meter the amount of material passing between gate 72 and drum 66 for the desired material application rate. After passing metering gate 72, material is propelled by brush 74 from channels 78 as drum 66 rotates beneath brush 74 to work the material into the turf.

It should then be noted that the positioning of drum 66 in front of hopper 30 and particularly intermediate the operator of the towing vehicle and hopper 30 is advantageous. Particularly, the operator of the towing vehicle can clearly see the operation of top dresser 10 and specifically the top dressing of the material to the ground. Specifically, the material is dispensed by drum 66 and brush 74 in front of hopper 30 such that hopper 30 does not block the view of the top dressing operation as occurred in prior rear unloading top dressers Thus, the operator can see that the material is being uniformly dispensed and at the desired rate.

Additionally, as the major mass of top dresser 10 is the material in hopper 30, wheels 16 are positioned below hopper 30 and spaced from dispensing drum 66 in a direction opposite to the direction top dresser 10 is being pulled, i.e. generally behind drum 66 and brush 74. It can then be appreciated that the material is top dressed on the turf prior to wheels 16 rolling thereon. It can be appreciated that wheels 16 rolling over the turf pushes and bends the grass downward In prior rear unloading top dressers, the dressing material was applied after the wheels pushed and bent the grass downward preventing penetration of the material in the turf and causing uneven distribution Top dresser 10 according to the teachings of the present invention dispenses the material to the turf in front of hopper 30 and wheels 16 and before the grass is bent and pushed downward thereby to increase material penetration and uniform distribution.

It should also be noted that the manner that wheels 16 are mounted in top dresser 10 according to the preferred teachings of the present invention is also advantageous. Prior top dressers had their support wheels mounted along a single axis As the terrain is not perfectly even but includes dips and mounds, not all of the wheels would engage the terrain with equal force and in fact in some cases some of the wheels would leave contact with the ground due to bridging or the like Thus, uneven pressure could be placed on the turf by wheels mounted along a single axis, with selected wheels putting excessive pressure while other wheels placing minimal or no pressure. Apparatus 10 according to the teachings of the present invention allows wheels 16 to float to match the contour of the terrain and prevent the application of excessive pressure at certain points due to uneven terrain causing bridging or the like. Specifically, leaf springs 20 allow each pair of wheels 16 to independently move vertically according to the terrain. Further, each pair of wheels 16 is allowed to pivot from side to side about stub shafts 26 to further match the terrain and more evenly distribute the mass of top dresser 10 and of the material located in hopper 30. Additionally, as each wheel 16 is mounted on an end of axle 28, removal of any single wheel 16 is relatively easy and does not require the entire axle to be dismantled as in prior single axle top dressers.

As material is being dispensed by drum 66 and brush 74, gate 56 is pulled forward from its first, expanded position towards its second, unloaded position by contracting actuators 58 and 60. As gate 56 is pulled forward, material in hopper 30 is similarly pushed forward in the direction top dresser 10 is being pulled toward drum 66 for dispensing thereby. It can be appreciated that pushing the material towards the dispensing means is advantageous rather than relying upon gravity to move the material to the dispensing means. Specifically, due to their nature, apparatus relying upon gravity tends to require greater height of the apparatus which have and/or moves the center of gravity higher with the addition of material thus requiring more complicated supporting structure or the like, makes the loading of material more difficult, and/or may make it more difficult for the operator of the towing vehicle to see over the hopper in use.

Further, many top dressers utilized endless conveyors on the bottom of the hopper to advance the material to the dispensing means. It can then be appreciated that the full mass of the material in the hopper rested on such endless conveyors. Thus, considerable energy was required to rotate the conveyor under the material and the conveyor was especially subject to wear, stretching, and breakage due to its continual exposure, to the sand and other grit of the material causing increased friction. Drum 66 according to the preferred teachings of the present invention is believed to be advantageous over prior endless conveyors. Specifically, drum 66 is not subjected to the entire mass of the material within hopper 30 as were prior endless conveyors. Thus, less energy is required to rotate drum 66 than to move prior endless conveyors. Additionally, drum 66 does not include relatively moving parts as in endless conveyors of either a belt or apron construction. Thus, drum 66 does not require tensioning apparatus required for endless conveyors, is not subject of the degree of wear as encountered for endless conveyors, and is easier to manufacture, assemble, and maintain than endless conveyors.

It should also be noted that the particular manner of moving pusher 44 of apparatus 10 is believed to be particularly advantageous. Specifically, slides 50, rails 52, blocks 54, and actuators 58 and 60 are positioned outside of hopper 30 and particularly away from the material in hopper 30. Thus, slides 50, rails 52, blocks 54, and actuators 58 and 60 are not prone to contamination by grit or the like creating friction in the sliding movement.

Further, actuators 58 and 60 according to the teachings of the present invention are contracting when pusher 44 is moving forward Thus, actuators 58 and 60 are in tension when under load and are not subject to bending forces as would occur if actuators 58 and 60 were in compression. Therefore, actuators 58 and 60 can be of a smaller size and a longer length than if they were arranged in compression under load.

Furthermore, in the cross mounted configuration, the longitudinal length of actuators 58 and 60 and thus of top dresser 10 is considerably reduced. Particularly, the dead space or in other words the longitudinal distance required for actuators 58 and 60 in their fully retracted condition with pistons 64 retracted in cylinders 62 is considerably reduced when actuators 58 and 60 are arranged angularly with respect to the longitudinal axis of top dresser 10 than if mounted parallel to the longitudinal axis.

Actuators 58 and 60 are hydraulically connected to move in unison to advance pusher 44 along bottom 34 of hopper 30. Thus binding of pusher 44 due to uneven movement relative to hopper 30 is prevented. Pusher 44 is advanced along bottom 34 to its second unloaded position adjacent to the front of hopper 30 and just behind drum 66. It should be noted that discharge gate 56 is angled such that material abutting therewith is not retained thereon but slides evenly onto drum 66. Further, the upward angle of discharge gate 56 allows the material under pressure from the forward movement of discharge gate to flow upward along the front face of discharge gate 56. Thus, the force created by the moving material against pusher 44, drum 66, and metering gate 72 is limited. Further, this configuration also limits the compressive forces between the particles in hopper 30 so as to reduce the possibility of creating adhesion between the particles. Adhesion results in a condition called bridging between metering gate 72 and discharge gate 56 which holds the material in suspension, preventing it from flowing downward to drum 66 and thereby stopping top dresser 10 from dispensing its load of material.

After all material has been dispensed from hopper 30, pusher 44 may be moved rearwardly to its rearmost position by expansion of actuators 58 and 60. It can be appreciated that while pusher 44 is being moved rearwardly, pusher 44 is in a no load condition as pusher 44 is not moving material Thus, the compression force on actuators 58 and 60 which may cause actuators 58 and 60 to bend or buckle, is minimal At that time, hopper 30 of top dresser 10 is ready to receive the next load of material for dispensing.

It should be noted that drum 66 according to the preferred teachings of the present invention is believed to be advantageous Particularly, the presence of ribs 76 on sheeting 70 insures that sheeting 70 is able to grip the material to be dispensed and draw it under metering gate 72. The presence of channels 78 on sheeting 70 insures that the material does not remain adhered to sheeting 70 and is able to be propelled therefrom by brush 74. It can then be appreciated that ribs 76 and channels 78 of the size and arrangement of the preferred form is believed to be particularly advantageous in this regard. Specifically, if the cavities were too small, they would tend to fill up with material such as sand and especially sand that has some clay and some moisture and brush 74 can not remove it from the cavities. On the other hand, if too large, the material is dispensed onto the ground in an uneven manner which is unacceptable to the user. The size and arrangement of channels 78 according to the preferred teachings of the present invention is a function of particle size, moisture, and clay content of the typical dressing materials to be applied and the contact pressure of brush 74 with drum 66 and allows satisfactory functioning for most top dressing material presently being used by golf course and sport field managers throughout the world.

Sheeting 70 in the preferred form is formed of rubber and in the most preferred form is formed from cleated belting. However, sheeting 70 can be formed of other materials such as plastic, steel, and aluminum as long as the functional requirements for drum 66 are met.

Figure 5:
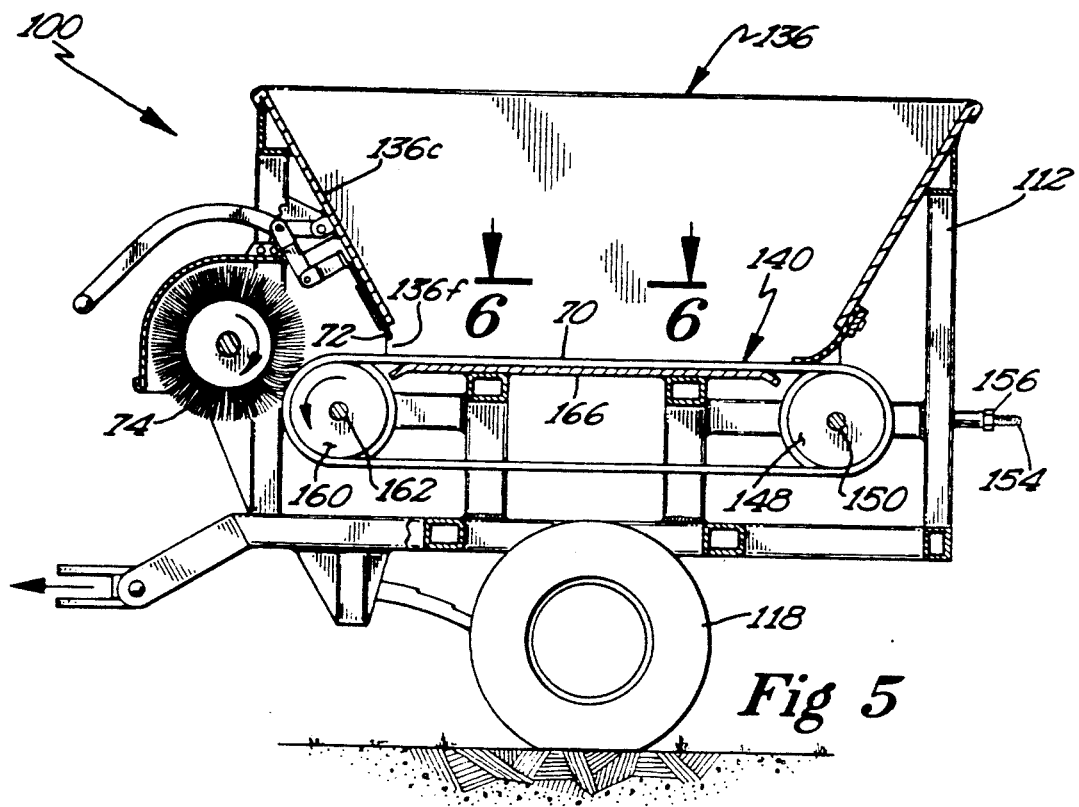
FIG. 5 shows a cross-sectional view of an alternate form of a top dresser according to the preferred teachings of the present invention.
Figure 6:
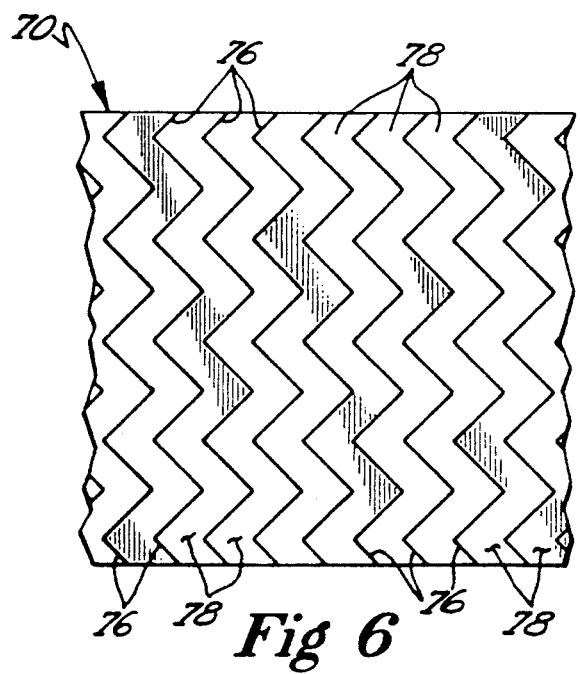
FIG. 6 shows a top plan view of the top dresser of FIG. 5 according to view lines 6—6 of FIG. 5.

Furthermore, cavities 78 can take other forms according to the teachings of the present invention For example, cavities 78 can have a closed diamond shape elongated axially across the length of drum 66 and can be formed by diagonally crossing ribs 76. Further, there may be other forms that would be acceptable depending upon the material being dispensed Now that the basic teachings of the present invention have been explained, many extensions and variations will be obvious to one having ordinary skill in the art. As an example, although top dresser 10 in the most preferred form includes several unique and novel features which are believed to produce synergistic results and be otherwise advantageous, such features can be utilized singly or in other combinations to obtain the advantages thereof For example, although sheeting 70 in the most preferred form of top dresser 10 covers drum 66 with the material being advanced within hopper 30 towards drum 66 and is believed to be advantageous at least for the reasons previously set forth including that the entire mass of the material is not subjected to drum 66, it may be desirable to utilize sheeting 70 in endless conveyor-type top dressers such as the type shown in U.S. Pat. No. 4,438,873 which is hereby incorporated herein by reference FIGS. 5 and 6 illustrate such an endless conveyor-type top dresser 100. Specifically, a conveyor 140 is disposed so that sheeting 70 in the form of an endless belt passes beneath a hopper 136, more specifically under its open bottom 136f, so as to have gravitationally discharged thereon whatever material is contained in hopper 136 that is to be used in dressing the turf. Sheeting 70 in the form of an endless belt passes over a first, generally cylindrical roller 148 rotatably mounted on a transverse shaft 150 which is adjustable in a fore and aft direction by means of threaded rods 154, each of which has a nut 156 thereon. Conveyor 140 further includes a second, generally cylindrical roller 160 mounted for rotation on a transverse shaft 162, with roller 160 being parallel to and horizontally spaced from roller 148. Roller 160 is rotated by any suitable means such as ground driven in the manner shown in U.S. Pat. No. 4,438,873. Sheeting 70 passes over a platen or bed plate 166 that is fixedly supported by frame 112 of top dresser 100, with bed plate 166 optionally including a coating or the like to reduce friction between bed plate 166 and sheeting 70. Conveyor 140 dispenses material from hopper 136 onto the ground through the end of hopper 136, with sheeting 70 being movable relative to end 136c of hopper 136. Top dresser 100 further includes metering gate 72 movably mounted at end 136c of hopper 136 and movable relative to conveyor 140 to meter the amount of material being dispensed Specifically, gate 72 is movable away from conveyor 140 by any suitable means to create a larger gap for material to pass therethrough such as by pivotally moving gate 72 manually or by hydraulic actuators. Cylindrical brush 74 is movably and rotatably mounted above and parallel to conveyor 140 and rollers 148 and 160 thereof Brush 74 is on the side of gate 72 opposite hopper 136 and in the same direction from gate 72 as the movement of sheeting 70 above bed plate 166 which is in the same direction which top dresser 100 is being pulled in the form shown in FIGS. 5 and 6. However, it can be appreciated that an endless conveyor-type top dresser utilizing sheeting 70 can be constructed in the manner of U.S. Pat. No. 4,438,873 which dispenses the material behind hopper 136. Brush 74 is rotated in an opposite direction as roller 160 to propel material from sheeting 70 of conveyor 140 onto the ground being dressed with a force sufficient to penetrate to the base of the turf Frame 112 upon which hopper 136 is mounted is movably supported upon the ground by any suitable means such as wheels 118. It can then be appreciated that sheeting 70 obtains the same and similar advantages in endless conveyor-type top dresser 100 as in cylindrical dispensing drum-type top dresser 10.

Thus since the invention disclosed herein may be embodied in other specific forms without departing from the spirit or general characteristics thereof, some of which forms have been indicated, the embodiments described herein are to be considered in all respects illustrative and not restrictive The scope of the invention is to be indicated by the appended claims, rather than by the foregoing description, and all changes which come within the meaning and range of equivalency of the claims are intended to be embraced therein

What is claimed is:

1. A top dresser adapted to be pulled across the ground in a first direction comprising, in combination: a frame; means for movably supporting the frame upon the ground; a hopper mounted to the frame and having closed first and second sides, a closed bottom, and an open front; a discharge gate movable between the sides of the hopper in the first direction from a first, expanded position to a second, unloaded position adjacent to the open front of the hopper; a cylindrical dispensing drum rotatably mounted adjacent to the front of the hopper about an axis located below the closed bottom of the hopper; a metering gate movably mounted at the front of the hopper and movable relative to the dispensing drum to meter the amount of material passing between the metering gate and the dispensing drum, with the discharge gate moving the material in the hopper in the first direction towards the dispensing drum for dispensing thereby, with the movably supporting means being spaced from the dispensing drum in a direction opposite to the first direction, with the material being dispensed by the dispensing drum in front of the hopper and the movably supporting means as the top dresser is being pulled in the first direction.

2. The top dresser of claim 1 wherein the dispensing drum has a periphery, with the periphery of the dispensing drum located above the bottom of the hopper, with the dispensing drum being rotatable with the periphery above the bottom moving generally in the first direction.

3. The top dresser of claim 2 further comprising, in combination: a cylindrical brush rotatably mounted on the opposite side of the cylindrical dispensing drum than the hopper and rotatable in a direction opposite to the dispensing drum, with the cylindrical brush including bristles engaging the periphery of the dispensing drum.

4. The top dresser of claim 2 wherein the periphery of the drum includes means for gripping the material and moving the material under the metering gate.

5. The top dresser of claim 4 wherein the gripping and moving means comprises corrugated sheeting located on the periphery of the cylindrical, dispensing drum.

6. The top dresser of claim 5 wherein the corrugated sheeting comprises a multiplicity of spaced, parallel ribs extending continuously in a direction generally perpendicular to the first direction, with the ribs defining spaced channels therebetween of generally constant depths for receiving material.

7. The top dresser of claim 6 wherein the ribs are in a herringbone arrangement.

8. The top dresser of claim 1 further comprising an improved construction for movably mounting the discharge gate for movement between the first, expanded position and the second, unloaded position comprising, in combination: first and second slide rails mounted to the first and second sides, with the first and second sides being located intermediate the first and second slide rails, with the first and second sides being spaced above the bottom; and first and second means extending oppositely from the discharge gate and between the first and second sides and the bottom for slideable support on the first and second slide rails.

9. The top dresser of claim 8 wherein the slideable support means comprises first and second ears extending from the discharge gate and between the first and second sides and the bottom.

10. The top dresser of claim 9 wherein the slide rails are elongated tubular rails; and wherein the slideable support means further comprises, in combination: first and second C-shaped slides having a size complementary to and for slideable receipt on the first and second tubular rails, with the C-shaped slides having their free ends pointing at each other.

11. The top dresser of claim 9 further comprising an improved construction for moving the discharge gate in the first direction between the first, expanded position and the second, unloaded position comprising, in combination: at least a first expandable and contractable actuator having a first end and a second end; means for pivotably mounting the first end of the first actuator adjacent to the front of the hopper about an axis; means for pivotably mounting the second end of the first actuator to the discharge gate about an axis, with a plane extending through the axes of the first actuator being at an angle to the first direction.

12. The top dresser of claim 11 wherein the second end of the first actuator is pivotally mounted to the first ear of the discharge gate outside of the first side.

13. The top dresser of claim 1 wherein the movably supporting means comprises a plurality of wheel assemblies, with each wheel assembly comprising, in combination: a leaf spring mounted to the frame in a cantilever manner parallel to the first direction and having a free end; an axle block; means for pivotably mounting the axle block to the free end of the leaf spring about an axis parallel to the first direction; and a pair of wheels rotatably mounted on opposite sides of the leaf spring about an axis extending through the axle block and perpendicular to the first direction.

14. The top dresser of claim 13 wherein each wheel assembly further comprises, in combination: a snubber bar mounted to the frame in a cantilever manner spaced above and parallel to the leaf spring and having a free end for abutting with the leaf spring to limit the vertical travel of the leaf spring.

15. The top dresser of claim 1 further comprising an improved construction for moving the discharge gate in the first direction between the first, expanded position and the second, unloaded position comprising, in combination: at least a first expandable and contractable actuator having a first end and a second end; means for pivotably mounting the first end of the first actuator adjacent to the front of the hopper about an axis; means for pivotably mounting the second end of the first actuator to the discharge gate about an axis, with a plane extending through the axes of the first actuator being at an angle to the first direction.

16. In a hopper including first and second closed sides, a closed bottom, an open first end, and a discharge gate extending between the first and second sides, an improved construction for movably mounting the discharge gate for movement between a first position spaced from the first end and a second position adjacent to the first end comprising, in combination: first and second slide rails mounted to the first and second sides, with the first and second sides being located intermediate the first and second slide rails, with the first and second sides being spaced above the bottom; and first and second means extending oppositely from the discharge gate and between the first and second sides and the bottom for slideable support on the first and second slide rails.

17. The hopper of claim 16 wherein the slideable support means comprises first and second ears extending from the discharge gate and between the first and second sides and the bottom.

18. The hopper of claim 17 wherein the slide rails are elongated tubular rails; and wherein the slideable support means further comprises, in combination: first and second C-shaped slides having a size complementary to and for slideable receipt on the first and second tubular rails, with the C-shaped slides having their free ends pointing at each other.

19. In a hopper including first and second closed sides, a closed bottom, an open first end, and a discharge gate extending between the first and second sides, an improved construction for moving the discharge gate in a first direction between a first position spaced from the first end and a second position adjacent to the first end comprising, in combination: at least a first expandable and contractable actuator having a first end and a second end; means for pivotably mounting the first end of the first actuator adjacent to the first end of the hopper about an axis; means for pivotably mounting the second end of the first actuator to the discharge gate about an axis, with a plane extending through the axes of the first actuator being at an angle to the first direction.

20. The hopper of claim 19 further comprising, in combination: a second expandable and contractable actuator having a first end and a second end; means for pivotably mounting the first end of the second actuator adjacent to the first end of the hopper about an axis; means for pivotably mounting the second end of the second actuator to the discharge gate about an axis, with a plane extending through the axes of the second actuator being at an angle to the first direction, with the plane of the axes of the first actuator intersecting with the plane of the axes of the second actuator at an angle other than 180°.

21. In a hopper including first and second closed sides, a closed bottom, an open first end, and a discharge gate extending between the first and second sides, an improved construction for moving the discharge gate in a first direction between a first position spaced from the first end and a second position adjacent to the first end comprising, in combination: at least a first expandable and contractable actuator having a first end and a second end; means for pivotably mounting the first end of the first actuator to the hopper about a vertical axis; and means for pivotally connecting the second end of the first actuator to the discharge gate about a vertical axis spaced from and parallel to the vertical axis of the first end of the first actuator, with the first actuator located vertically below the bottom and between the first and second sides.

22. In a top dresser adapted to be moved across the ground in a first direction comprising: in combination: a frame; means for movably supporting the frame upon the ground; a hopper mounted to the frame and having an end; means for dispensing the material from the hopper onto the ground through the end of the hopper; and a metering gate movably mounted at the end of the hopper and movable relative to the dispensing means to meter the amount of material being dispensed; with the dispensing means being improved and comprising corrugated sheeting movable relative to the end of the hopper; wherein the corrugated sheeting comprises a multiplicity of spaced, parallel ribs extending continuously in a direction generally perpendicular to the first direction between the sides of the corrugated sheeting with the ribs defining spaced channels therebetween of generally constant depths for receiving material and not being parallel to the metering gate.

23. The top dresser of claim 22 wherein the ribs define spaced, continuous channels therebetween.

24. The top dresser of claim 23 wherein the ribs are in a herringbone arrangement.

25. The top dresser of claim 24 wherein the dispensing means further comprises, in combination: a cylindrical dispensing drum rotatably mounted adjacent to the end of the hopper, with the corrugated sheeting covering the entire periphery of the cylindrical dispensing drum.

26. The top dresser of claim 24 wherein the dispensing means further comprises, in combination: an endless conveyor including first and second, spaced, parallel rollers, with the corrugated sheeting being in the form of an endless belt passing around the first and second rollers.

27. Method for dispensing material from a hopper into the ground through an end of the hopper as the hopper is moved across the ground in a first direction comprising the steps of moving corrugated sheeting relative to the end of the hopper, wherein the corrugated sheeting comprises a multiplicity of spaced, parallel ribs extending continuously in a direction generally perpendicular to the first direction between the sides of the corrugated sheeting, with the ribs defining spaced channels therebetween of generally constant depths for receiving material; and moving a metering gate relative to the end of the hopper and to the corrugated sheeting to meter the amount of material being dispensed, with the ribs not being parallel to the metering gate.

28. The dispensing method of claim 27 wherein the moving step comprises the steps of covering the entire periphery of a cylindrical dispensing drum with the corrugated sheeting; and rotating the cylindrical dispensing drum adjacent to the end of the hopper.

29. The dispensing method of claim 27 wherein the moving step comprises the steps of forming the corrugated sheeting into an endless belt passing around first and second, spaced, parallel rollers; and rotating at least one of the first and second rollers.

* * * * *

UNITED STATES PATENT AND TRADEMARK OFFICE
CERTIFICATE OF CORRECTION

PATENT NO. : 5,307,952

DATED : May 3, 1994

INVENTOR(S) : Vernon J. Worrel et al.

It is certified that error appears in the above-identified patent and that said Letters Patent is hereby corrected as shown below:

Column 1, line 68, after "dresser" insert --.--.
Column 2, line 7, cancel "nously" and substitute therefor --nuously--.
Column 2, line 45, after "details" insert --.--.
Column 5, line 39, after "therein" insert --.--.
Column 6, line 12, after "dressers" insert --.--.
Column 6, line 23, after "downward" insert --.--.
Column 6, line 27, after "distribution" insert --.--.
Column 6, line 37, after "axis" insert --.--.
Column 6, line 41, after "like" insert --.--.
Column 7, line 17, after "exposure" delete --,--.
Column 7, line 43, after "forward" insert --.--.
Column 8, line 19, after "material" insert --.--.
Column 8, line 21, after "minimal" insert --.--.
Column 8, line 26, after "advantageous" insert --.--.
Column 8, line 55, after "invention" insert --.--.
Column 8, line 60, after "dispensed" insert --.--.

UNITED STATES PATENT AND TRADEMARK OFFICE
CERTIFICATE OF CORRECTION

PATENT NO. : 5,307,952
DATED : May 3, 1994
INVENTOR(S) : Vernon J. Worrel, et al It is certified that error appears in the above-indentified patent and that said Letters Patent is hereby corrected as shown below:

```
Column 9, line 1, after "thereof" insert --.--.
Column 9, line 10, after "reference" insert --.--.
Column 9, line 38, after "dispensed" insert --.--.
Column 9, line 44, after "thereof" insert --.--.
Column 9, line 56, after "turf" insert --.--.
Column 9, line 68, after "restrictive" insert --.--.
Column 10, line 4, after "therein" insert --.--.
Column 10, line 47, after "cylindrical" delete --,--.
Column 12, line 48, cancel "mounting" and substitute therefor --connecting--.
Column 12, line 57, cancel "comprising:" and substitute therefor --comprising,--
Column 13, line 2, after "sheeting" insert --,--.
Column 13, line 23, cancel "into" and substitute therefor --onto--.
```

Signed and Sealed this

Sixteenth Day of August, 1994

Attest:

BRUCE LEHMAN

Attesting Officer

Commissioner of Patents and Trademarks